United States Patent
Lim et al.

(10) Patent No.: US 11,284,349 B2
(45) Date of Patent: Mar. 22, 2022

(54) METHOD AND APPARATUS FOR TRANSMITTING FRAME IN WIRELESS LAN SYSTEM

(71) Applicant: LG ELECTRONICS INC., Seoul (KR)

(72) Inventors: Dongguk Lim, Seoul (KR); Eunsung Park, Seoul (KR); Jinyoung Chun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 16/754,729

(22) PCT Filed: Oct. 8, 2018

(86) PCT No.: PCT/KR2018/011812
§ 371 (c)(1),
(2) Date: Apr. 8, 2020

(87) PCT Pub. No.: WO2019/074249
PCT Pub. Date: Apr. 18, 2019

(65) Prior Publication Data
US 2020/0314754 A1    Oct. 1, 2020

Related U.S. Application Data

(60) Provisional application No. 62/572,545, filed on Oct. 15, 2017.

(30) Foreign Application Priority Data

Mar. 15, 2018  (KR) ........................ 10-2018-0030174
Jun. 28, 2018  (KR) ........................ 10-2018-0074565

(51) Int. Cl.
H04W 52/02    (2009.01)
H04W 84/12    (2009.01)
H04W 88/08    (2009.01)

(52) U.S. Cl.
CPC ........ *H04W 52/0235* (2013.01); *H04W 84/12* (2013.01); *H04W 88/08* (2013.01)

(58) Field of Classification Search
CPC . H04W 52/0235; H04W 84/12; H04W 88/08; H04L 27/04; H04L 27/26
See application file for complete search history.

(56) References Cited

U.S. PATENT DOCUMENTS 9,197,473 B2    11/2015  Porat et al.
2014/0269462 A1  9/2014  Jia et al.
(Continued)

FOREIGN PATENT DOCUMENTS

KR    20170018397    2/2017

OTHER PUBLICATIONS

PCT International Application No. PCT/KR2018/011812, International Search Report and Written Opinion dated Jan. 18, 2019, 23 pages.

(Continued)

*Primary Examiner* — Mohammad S Anwar
(74) *Attorney, Agent, or Firm* — Lee Hong Degerman Kang Waimey

(57) ABSTRACT

A method for transmitting a physical protocol data unit (PPDU) by an access point (AP) in a wireless LAN (WLAN) according to an embodiment of the present disclosure may comprise the steps of: generating a legacy-signal (L-SIG) field for a wake-up radio (WUR) PPDU; on the basis of the L-SIG field, generating one binary phase shift keying (BPSK) symbol located between the L-SIG field and a WUR band preamble; and transmitting the WUR PPDU including (Continued)

the L-SIG field, the one BPSK symbol, and the WUR band preamble, wherein the AP generates the one BPSK symbol on the basis of the same bit sequence as a bit sequence for the L-SIG field.

12 Claims, 23 Drawing Sheets

(56) References Cited

U.S. PATENT DOCUMENTS

| | | | |
|---|---|---|---|
| 2017/0142721 A1 | 5/2017 | Azizi et al. | |
| 2018/0020409 A1* | 1/2018 | Aboul-Magd | H04L 27/2602 |
| 2018/0103431 A1* | 4/2018 | Suh | H04B 1/707 |
| 2018/0206192 A1* | 7/2018 | Vermani | H04L 5/0094 |

OTHER PUBLICATIONS

Newracom, "Considerations on PAPR of Wake Up Packet," IEEE 802.11-17/1344r0, Sep. 11, 2017, 22 pages.

* cited by examiner

OFDM training structure

FIG. 21 bit sequence index for extra 4 tones

| options | conv | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| FB0,L,FCS2 | 7.0897 | 6.4912 | 7.2794 | 6.7108 | 7.7216 | 7.0347 | 7.7296 | 7.6236 | 7.8454 | 5.9551 | 6.7487 | 5.7981 | 6.9111 | 6.6895 | 7.4344 | 6.6005 | 7.3834 |
| FB0,H,FCS2 | 6.3169 | 6.9316 | 7.2006 | 5.8795 | 6.3369 | 6.9693 | 7.3342 | 6.5699 | 6.3267 | 5.8413 | 6.5748 | 5.8746 | 6.2754 | 6.0557 | 6.2755 | 5.8673 | 6.1533 |
| FB16,L,FCS2 | 6.5732 | 6.2099 | 5.3071 | 7.1076 | 6.2435 | 6.6005 | 5.7989 | 7.6236 | 6.6005 | 6.7945 | 6.1612 | 7.6855 | 6.8213 | 6.2592 | 5.4099 | 7.1504 | 6.2928 |
| FB16,H,FCS2 | 6.5647 | 6.0484 | 5.3101 | 6.0395 | 5.2564 | 6.8479 | 6.1251 | 6.6734 | 5.6109 | 7.074 | 6.1263 | 7.0145 | 6.4291 | 7.4899 | 6.8761 | 7.5335 | 6.712 |
| worst PAPR | 7.0897 | 6.9316 | 7.2794 | 7.1076 | 7.7216 | 7.0347 | 7.7296 | 7.6236 | 7.8454 | 7.074 | 6.7487 | 7.6855 | 6.9111 | 7.4899 | 7.4344 | 7.5335 | 7.3834 |

METHOD AND APPARATUS FOR TRANSMITTING FRAME IN WIRELESS LAN SYSTEM

CROSS-REFERENCE TO RELATED APPLICATIONS

This application is the National Stage filing under 35 U.S.C. 371 of International Application No. PCT/KR2018/011812, filed on Oct. 8, 2018, which claims the benefit of U.S. Provisional Application No. 62/572,545, filed on Oct. 15, 2017, and also claims the benefit of earlier filing date and right of priority to Korean Application Nos. 10-2018-0030174, filed on Mar. 15, 2018, and 10-2018-0074565, filed on Jun. 28, 2018, the contents of which are all hereby incorporated by reference herein in their entirety.

TECHNICAL FIELD

The present disclosure relates to a wireless LAN system, and more particularly, to a method for transmitting or receiving PPDU through WUR (wake-up radio) and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.1 lax standards are under discussion.

DISCLOSURE

Technical Problem

An object of the present disclosure is to provide a method for efficiently and exactly transmitting WUR PPDU including 1 BPSK symbol for packet classification and an apparatus therefor.

The objects that could be achieved with the present disclosure are not limited to what has been particularly described hereinabove, and other objects that the present disclosure could achieve will be more clearly understood from the following detailed description.

Technical Solution

To achieve the object of the present disclosure, a method for transmitting a physical protocol data unit (PPDU) by an access point (AP) in a wireless LAN (WLAN) according to one aspect of the present disclosure comprises generating a legacy-signal (L-SIG) field for a wake-up radio (WUR) PPDU; generating one (1) binary phase shift keying (BPSK) symbol located between the L-SIG field and a WUR band preamble on the basis of the L-SIG field; and transmitting the WUR PPDU including the L-SIG field, the 1 BPSK symbol, and the WUR band preamble, wherein the AP may generate the 1 BPSK symbol on the basis of the same bit sequence as a bit sequence for the L-SIG field.

To achieve the object of the present disclosure, an access point (AP) for transmitting a physical protocol data unit (PPDU) in a wireless LAN (WLAN) according to another aspect of the present disclosure comprises a processor generating a legacy-signal (L-SIG) field for a wake-up radio (WUR) PPDU and generating one (1) binary phase shift keying (BPSK) symbol located between the L-SIG field and a WUR band preamble on the basis of the L-SIG field; and a transmitter transmitting the WUR PPDU including the L-SIG field, the 1 BPSK symbol, and the WUR band preamble under the control of the processor, wherein the processor generates the 1 BPSK symbol on the basis of the same bit sequence as a bit sequence for the L-SIG field.

The 1 BPSK symbol may repeat the L-SIG field in a time domain.

The L-SIG field may include length information on the WUR PPDU, and the AP may configure the length information such that modulo 3 computation for length information included in each of the L-SIG field and the 1 BPSK symbol where L-SIG field is repeated satisfies 0.

The L-SIG field for the WUR PPDU may be transmitted using more additional tones in a frequency domain than L-SIG field for PCR (primary connectivity radio) PPDU.

The L-SIG field for PCR PPDU may correspond to a total of 53 tones including a center tone, and the L-SIG field for WUR PPDU may correspond to a total of 57 tones including a center tone.

A sequence to be applied to the additional tones may be a sequence having a minimum PAPR (peak-to-average power ratio) for a frame body size, FCS (frame check sequence) and combinations of data rates, which are supported from the WUR PPDU.

The number of additional tones may be 4, and a sequence to be applied to the additional tones may be [1, −1, −1, 1].

The frame body size supported from the WUR PPDU may include 0 byte and 16 bytes, the FCS may include 2 bytes, and the data rate may include 62.5 kbps and 250 kbps.

Advantageous Effects

According to one embodiment of the present disclosure, since 1 BPSK symbol for packet classification is generated through the same bit sequence as a bit sequence of L-SIG, additional operation or processing for generating 1 BPSK symbol may be minimized.

Other technical effects in addition to the above-described effects may be inferred from embodiments of the present disclosure.

BRIEF DESCRIPTION OF THE DRAWINGS

FIG. 21 is an explanatory diagram of a PAPR of L-SIG for a frame body, FCS and combination of data rates of WUR PPDU.

BEST MODE FOR CARRYING OUT THE INVENTION

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure.

The following detailed description includes specific details in order to provide a thorough understanding of the present disclosure. However, it will be apparent to those skilled in the art that the present disclosure may be practiced without such specific details. In some instances, known structures and devices are omitted or are shown in block diagram form, focusing on important features of the structures and devices, so as not to obscure the concept of the present disclosure.

As described before, the following description is given of a method and apparatus for increasing a spatial reuse rate in a Wireless Local Area Network (WLAN) system. To do so, a WLAN system to which the present disclosure is applied will first be described in detail.

Figure 1:
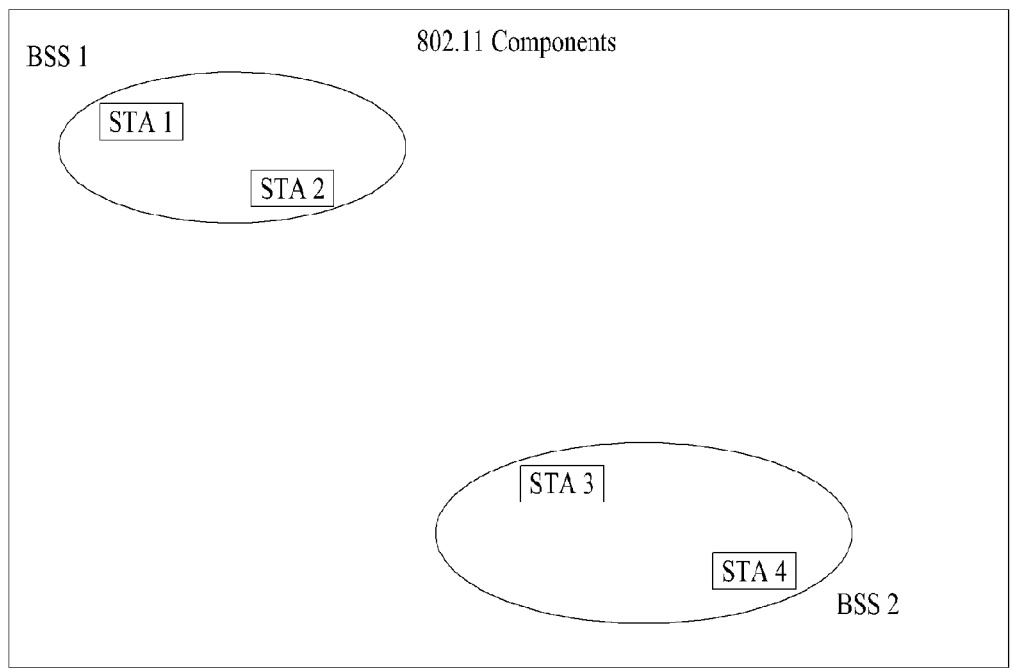
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
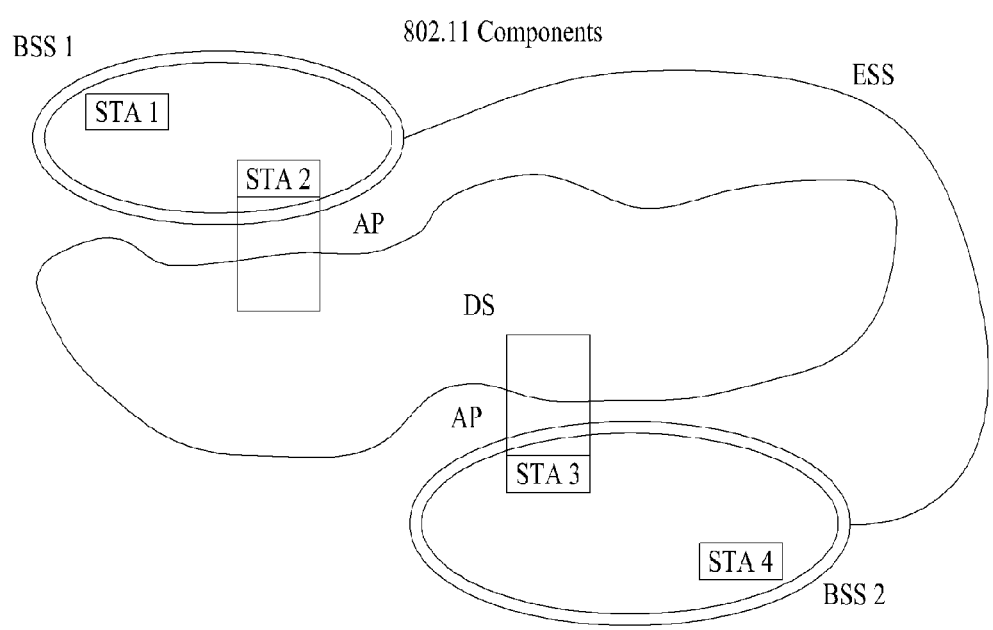
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
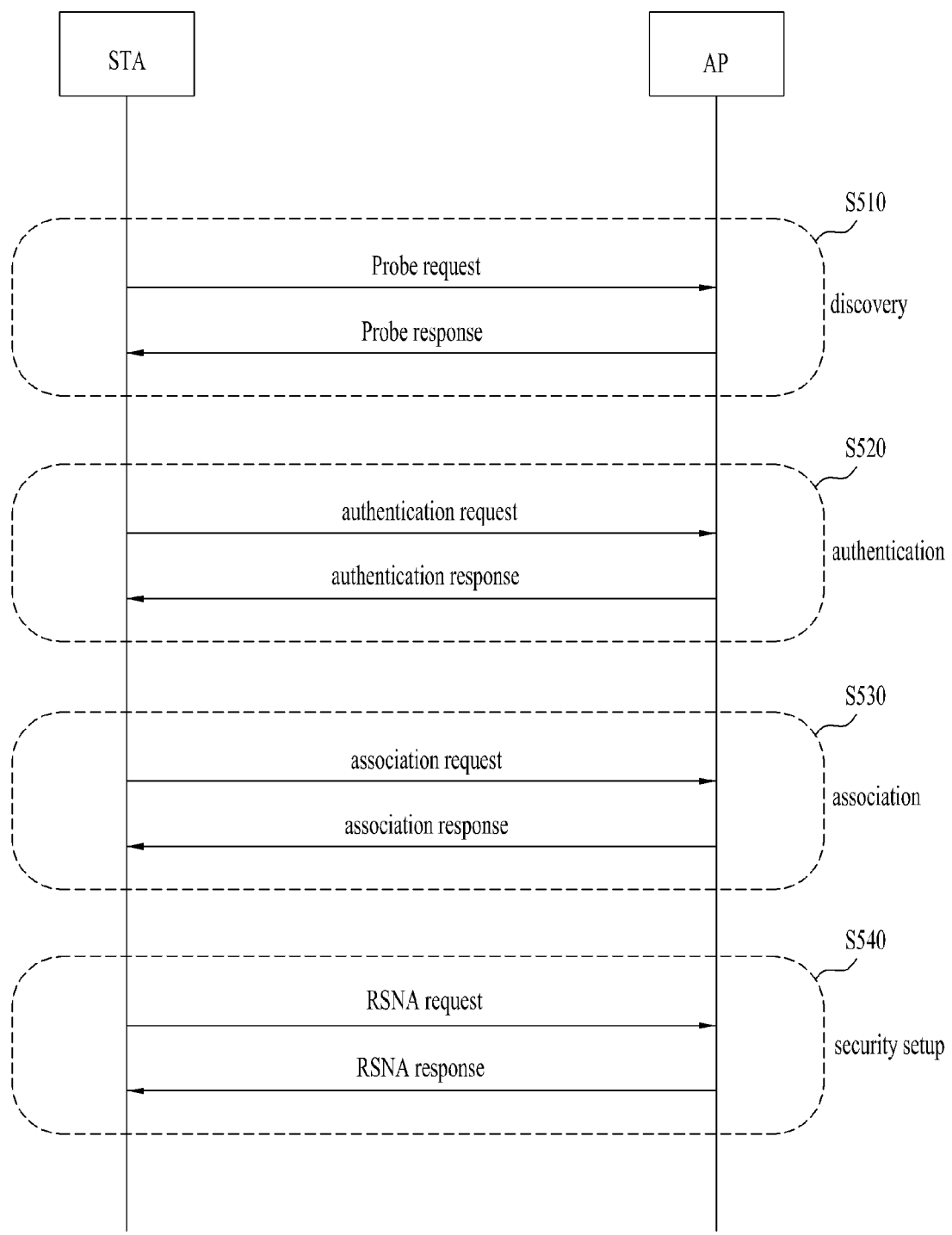
FIG. 3 illustrates a general link setup procedure.

FIG. 3 is a flowchart explaining a general link setup process according to an exemplary embodiment of the present disclosure.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
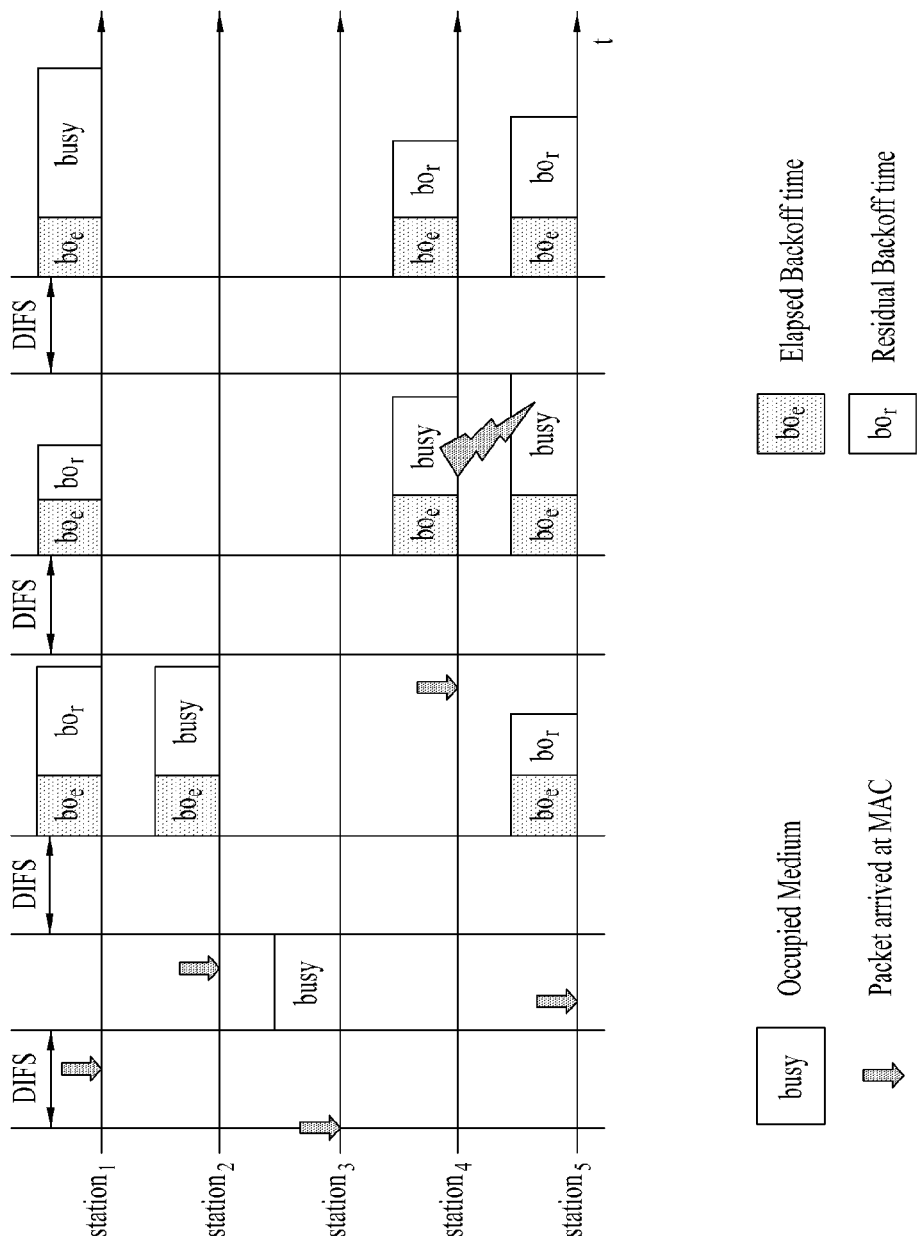
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to 2n−1 (where n=0, 1, 2, ...).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present disclosure.

Figure 5:
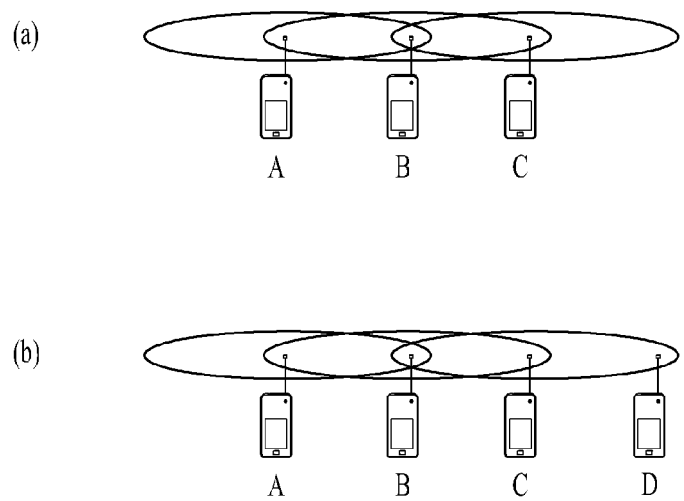
FIG. 5 is an explanatory diagram of a hidden node and an exposed node.

FIG. 5 is a conceptual diagram illustrating a hidden node and an exposed node.

FIG. 5(*a*) exemplarily shows the hidden node. In FIG. 5(*a*), STA A communicates with STA B, and STA C has information to be transmitted. In FIG. 5(*a*), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(*b*) exemplarily shows an exposed node. In FIG. 5(*b*), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
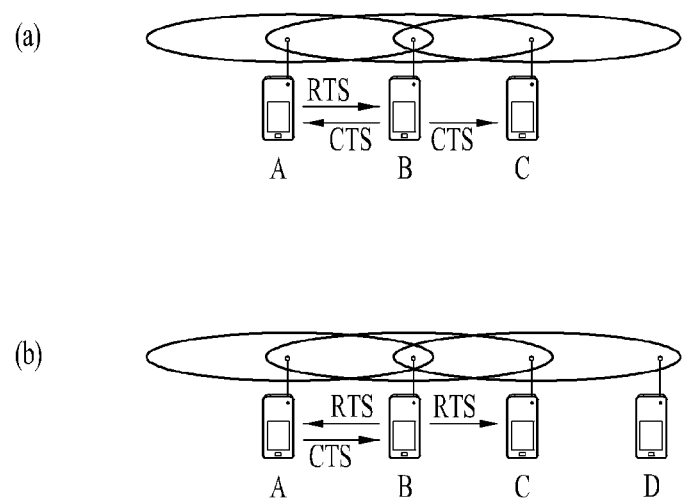
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(*a*) exemplarily shows the method for solving problems of the hidden node. In FIG. 6(*a*), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(*b*) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
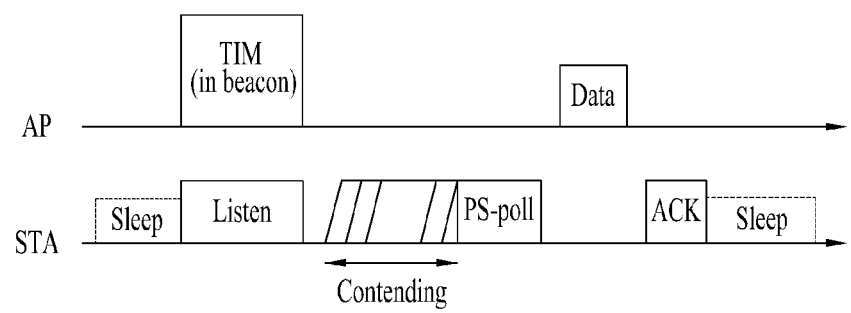
FIGS. 7 to 9 are explanatory diagrams of operation of an STA that has received TIM.
Figure 8:
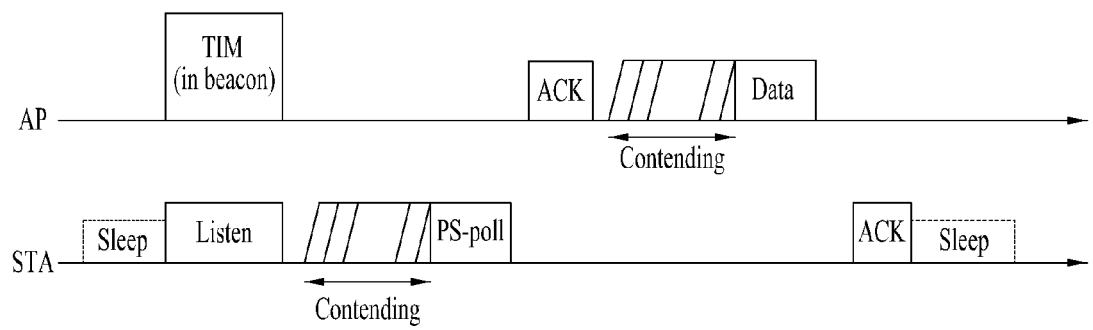
Figure 9:
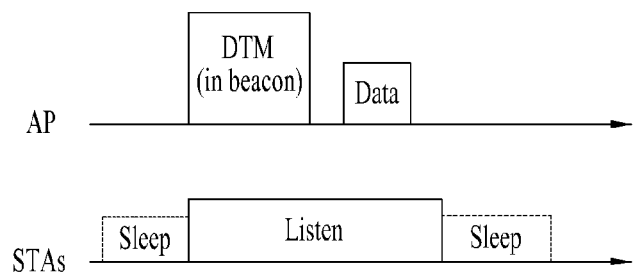

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
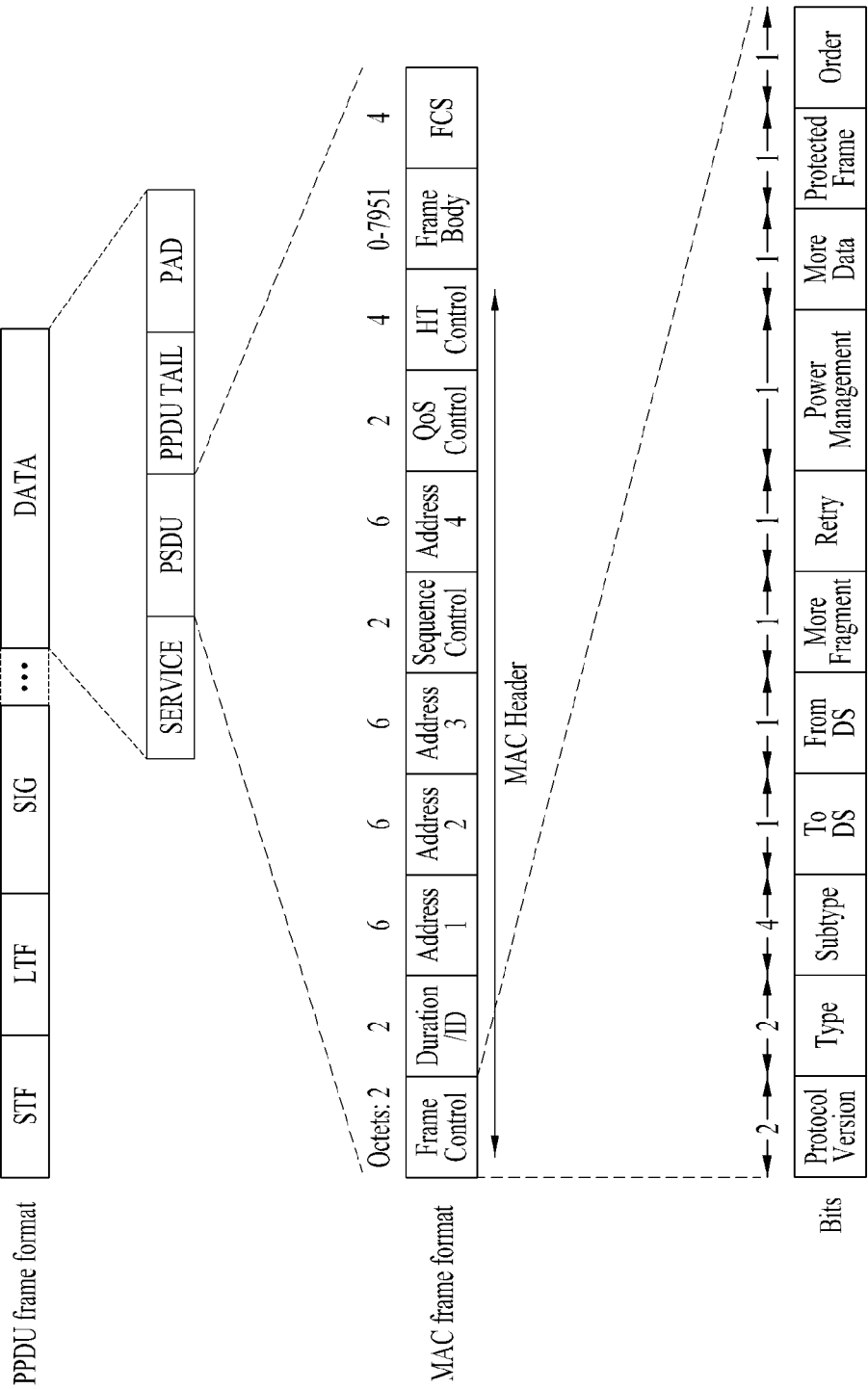
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (its). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

WUR (Wake-Up Radio)

First, a general description of a Wake-Up Radio Receiver (WURx), which is compatible with a WLAN system (e.g., 802.11), will now be given with reference to FIG. 11.

Figure 11:
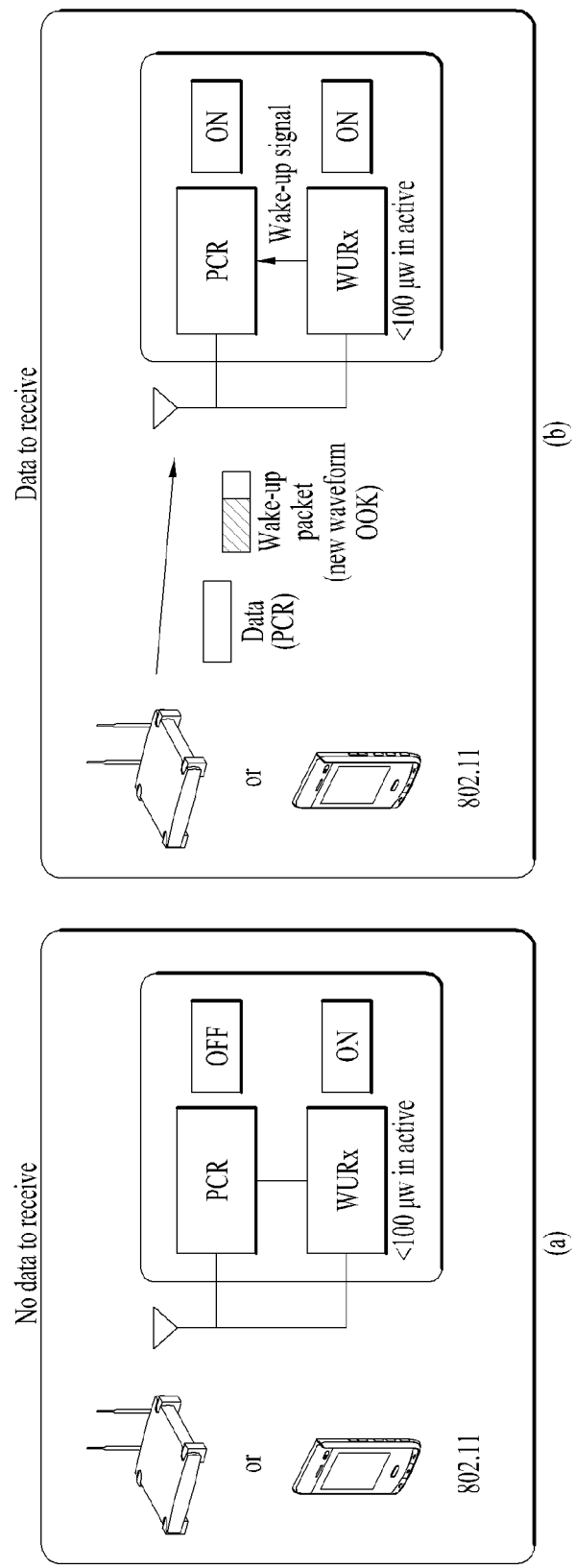
FIG. 11 is an explanatory diagram of a WUR receiver usable in a WLAN system (e.g., 802.11).

Referring to FIG. 11, an STA may support a Primary Connectivity Radio (PCR) (e.g., IEEE 802.11a/b/g/n/ac/ax WLAN), which is used for main wireless communication, and a Wake-Up Radio (WUR) (e.g., IEEE 802.11ba).

The PCR is used for data transmission and reception and may be turned off when there is no data to be transmitted and received. In the case in which the PCR is turned off, if there is a packet to be received, a WURx of the STA may wake the PCR. Therefore, user data is transmitted through the PCR.

The WURx may not be used for user data and may function only to wake a PCR transceiver. The WURx may be a simple type of receiver without a transmitter and is activated while the PCR is turned off. In an active state, target power consumption of the WURx desirably does not exceed 100 microwatts (μW). To operate at such low power, a simple modulation scheme, for example, On-Off Keying (OOK), may be used and a narrow bandwidth (e.g., 4 MHz or 5 MHz) may be used. A reception range (e.g., distance) aimed by the WURx may conform to current 802.11.

Figure 12:
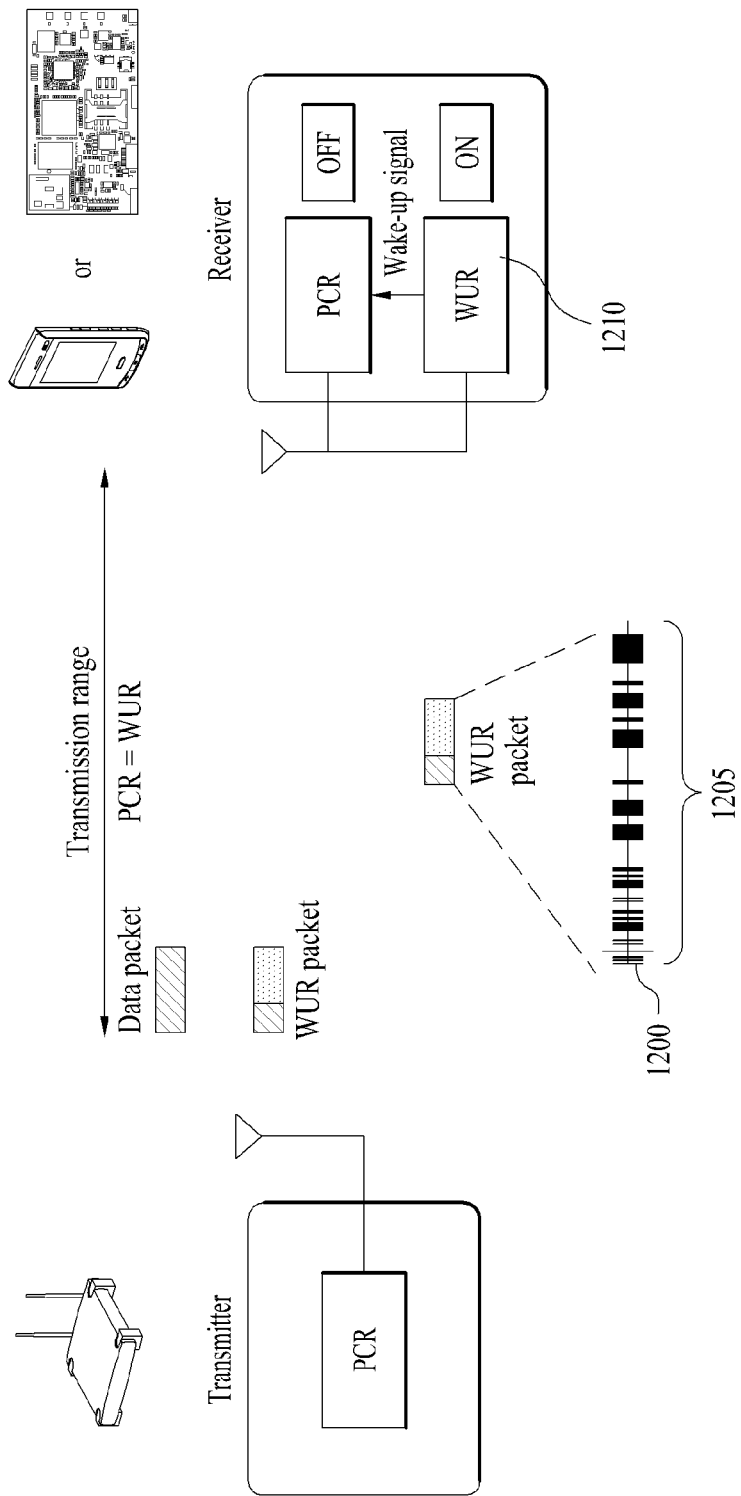
FIG. 12 is an explanatory diagram of operation of a WUR receiver.

FIG. 12 is an explanatory diagram of design and operation of a WUR packet.

Referring to FIG. 12, the WUR packet may include a PCR part 1200 and a WUR part 1205.

The PCR part 1200 is used for coexistence with a legacy WLAN system and the PCR part may be referred to as a WLAN preamble. To protect the WUR packet from other PCR STAs, at least one of an L-STF, an L-LTF, or an L-SIG of a legacy WLAN may be included in the PCR part 1200. Therefore, a third party legacy STA may be aware, through the PCR part 1200 of the WUR packet, that the WUR packet is not intended therefor and a medium of a PCR has been occupied by another STA. However, the WURx does not decode the PCR part of the WUR packet. This is because the WURx supporting narrowband and OOK demodulation does not support reception of a PCR signal.

At least a portion of the WUR part 1205 may be modulated using OOK. For example, the WUR part may include at least one of a WUR preamble, a MAC header (e.g., a receiver address, etc.), a frame body, or a Frame Check Sequence (FCS). OOK modulation may be performed by correcting an OFDM transmitter.

A WURx 1210 may consume very low power less than 100 μW as described above and may be implemented by a small, simple OOK demodulator.

Thus, since the WUR packet needs to be designed to be compatible with the WLAN system, the WUR packet may include a preamble (e.g., an OFDM scheme) of a legacy WLAN and a new Low-Power (LP)-WUR signal waveform (e.g., an OOK scheme).

Figure 13:
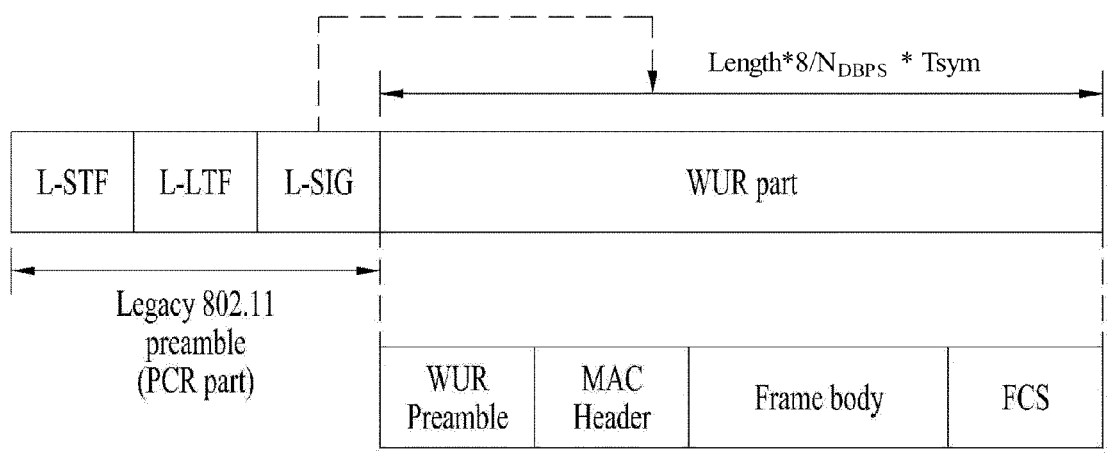
FIG. 13 illustrates an example of WUR packet.

FIG. 13 illustrates an example of WUR packet. The WUR packet of FIG. 13 includes a PCR part (e.g., legacy wireless LAN preamble) for coexistence with a legacy STA.

Referring to FIG. 13, the legacy wireless LAN preamble may include L-STF, L-LTF and L-SIG. Also, the wireless LAN STA (e.g., 3rd Party) may identify an end of WUR packet through L-SIG. For example, the L-SIG field may indicate a length of a payload (e.g., OOK modulated) of the WUR packet.

The WUR part may include at least one of WUR preamble, MAC header, frame body and FCS. The WUR preamble, for example, may include PN sequence. The MAC header may include a receiver address. The frame body may include other information required for wake-up. The FCS may include CRC (cyclic redundancy check).

Figure 14:
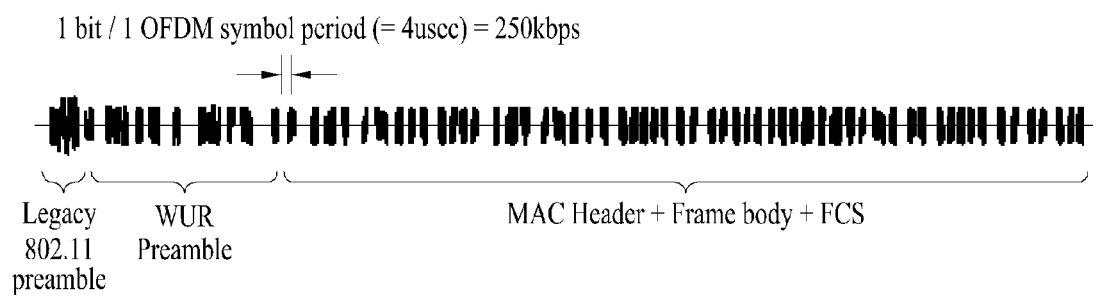
FIG. 14 illustrates waveforms of WUR packet.

FIG. 14 illustrates waveforms of WUR packet. Referring to FIG. 14, 1 bit per 1 OFDM symbol length (e.g., 4 usec) may be transmitted from the OOK modulated WUR part. Therefore, a data rate of the WUR part may be 250 kbps.

Figure 15:
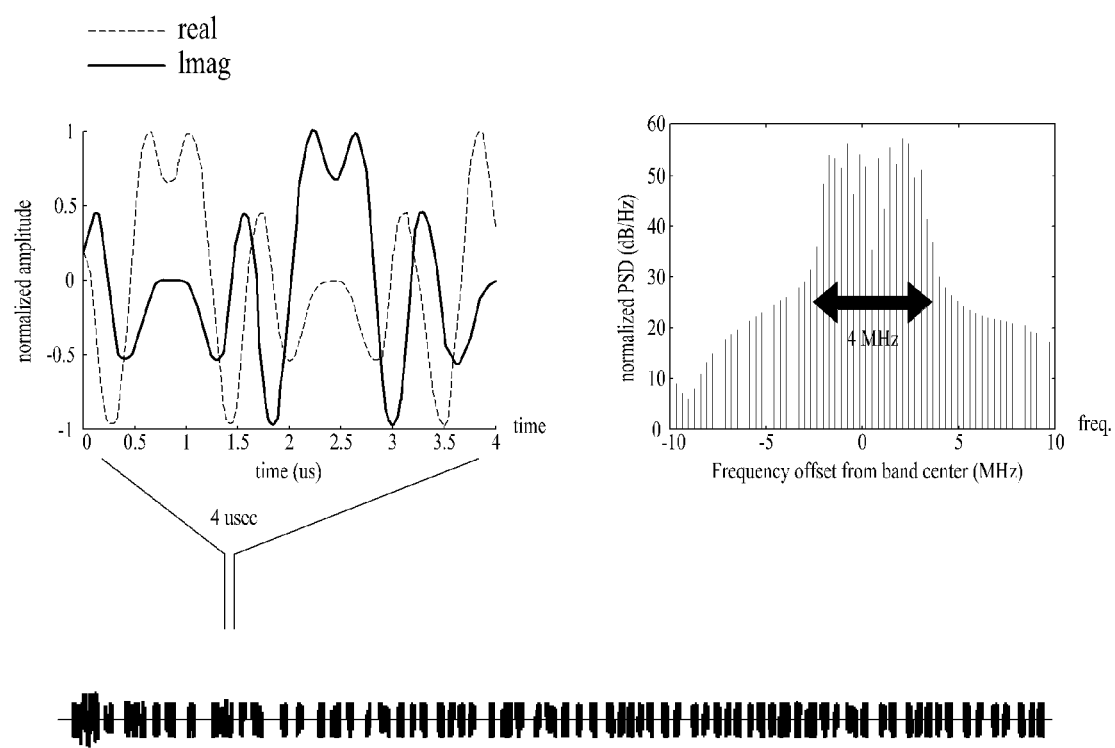
FIG. 15 is an explanatory diagram of WUR packet generated using an OFDM transmitter of a wireless LAN.

FIG. 15 is an explanatory diagram of WUR packet generated using an OFDM transmitter of a wireless LAN. In the wireless LAN, a PSK (phase shift keying)-OFDM transmission scheme is used, and a separate OOK modulator is added for OOK modulation, whereby a problem occurs in that generation of the WUR packet increases an implementation cost of the transmitter. Therefore, a method for generating OOK modulated WUR packet by reusing the OFDM transmitter will be described.

According to the OOK modulation scheme, a bit value of 1 is modulated to a symbol (i.e., on) carried with a random power or having a power of a threshold value or more, and a bit value of 0 is modulated to a symbol (i.e., off) which is not carried with a power or has a power less than a threshold value. On the contrary, the bit value of 1 may be defined as power off.

In this way, in the OOK modulation scheme, the bit value of I/O is indicated through on/off of a power at a corresponding symbol position. This simple OOK modulation/demodulation scheme has an advantage in that a power consumed for signal detection/demodulation of a receiver and a cost for implementing the signal detection/demodulation may be reduced. Also, OOK modulation for on/off of a signal may be performed by reusing the legacy OFDM transmitter.

A left graph of FIG. 15 illustrates a real part and an imaginary part of a normalized amplitude during 1 symbol period (e.g., 4 usec) for the bit value of 1 OOK modulated reusing the OFDM transmitter of the legacy wireless LAN. Since the OOK modulated result of the bit value of 0 corresponds to power-off, its drawing will be omitted.

A right graph of FIG. 15 illustrates a normalized PSD (power spectral density) on a frequency domain for the bit value of 1 OOK modulated reusing the OFDM transmitter of the legacy wireless LAN. For example, a center 4 MHz in a corresponding band may be used for WUR. In FIG. 15, it is assumed that WUR operates at a bandwidth of 4 MHz. However, this is for convenience of description, and a frequency bandwidth of another size may be used. In this case, it is preferable for power attenuation that WUR operates at a bandwidth smaller than an operation bandwidth of PCR (e.g., the legacy wireless LAN).

In FIG. 15, it is assumed that a subcarrier width (e.g., subcarrier spacing) is 312.5 kHz, and a bandwidth of OOK pulse corresponds to 13 subcarriers. 13 subcarriers correspond to about 4 MHz (i.e., 4.06 MHz=13*312.5 kHz) as described above.

In the legacy OFDM transmitter, an input sequence of IFFT (inverse fast Fourier transform) is defined as s={13 subcarrier tone sequence}, and IFFT for a corresponding sequence 's' is performed like Xt=IFFT(s) and then a CP (cyclic prefix) of a 0.8 usec length is attached to obtain about 4 us symbol length.

The WUR packet may be referred to as WUR signal, WUR frame or WUR PPDU. The WUR packet may be a packet (e.g., WUR beacon) for broadcast/multicast or a packet (e.g., packet for terminating and waking up WUR mode of a specific WUR STA) for unicast.

Figure 16:
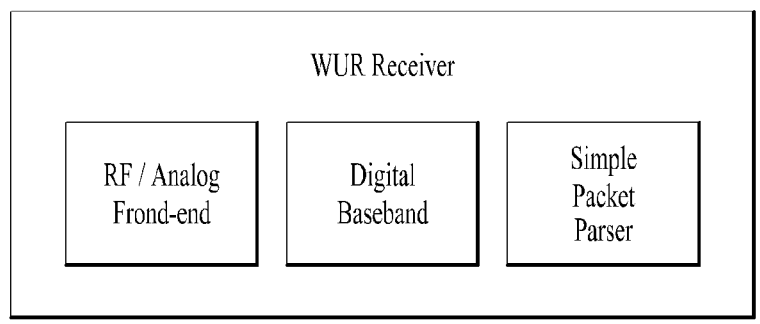
FIG. 16 illustrates a structure of WUR receiver.

FIG. 16 illustrates a structure of WURx(WUR receiver). Referring to FIG. 16, WURx may include RF/analog Front-end, a digital base band processor, and a simple packet parser. FIG. 16 is an exemplary, and WUR receiver of the present disclosure is not limited to FIG. 16.

Hereinafter, WLAN STA having a WUR receiver will simply be referred to as WUR STA. The WUR STA may simply be referred to as STA.

A payload of WUR PPDU for waking up PCR may be transmitted through one of various data rates. A data rate of WUR payload may be 62.5 kbps or 250 kbps.

One BPSK Symbol in WUR Preamble

Figure 17:
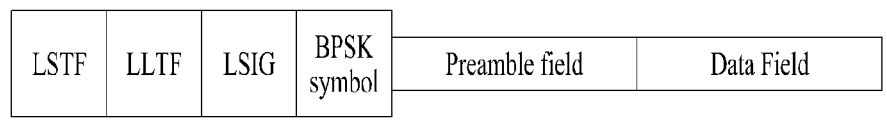
FIG. 17 illustrates WUR PPDU format according to one embodiment of the present disclosure.

FIG. 17 illustrates WUR PPDU according to one embodiment of the present disclosure.

Referring to FIG. 17, for coexistence of the legacy PCR and WUR, L-Part is located to be earlier than WUR part in the WUR PPDU, and the WUR part may include WUR-preamble and WUR-body. The WUR-Body includes control information not data on WUR STA. The L-PART is transmitted for a 3rd party STA not the WUR receiver, and the WUR receiver may not decode the L-part. The WUR part may be transmitted at a narrow bandwidth by using a portion of available tones within a BW at which the L-part is transmitted (e.g., 4 MHz BW). The number of available tones of the WUR part is 13, for example, when OFDM numerology of 11a is used, and a length of a frequency sequence for configuring WUR ON symbol is the same as the number of available tones.

Since the WUR PPDU is transmitted using a narrow bandwidth within 20 MHz, a third party device (e.g., 3rd party PCR STA) that has received WUR PPDU may recognize a signal part received next to the L-part as QPSK symbol in error during packet classification, and as a result may make a miss detection as PPDU (e.g., 11n HT PPDU) of another format. In order to avoid this miss detection, one OFDM symbol subjected to BPSK modulation is added to WUR PPDU next to the L-part.

In this way, since 1 BPSK symbol added for packet classification is OFDM symbol generated through IFFT function, the 1 BPSK symbol may have a high PAPR. Therefore, the present specification suggests symbol configuration for reducing a PAPR for 1 BPSK symbol.

A part of WUR PPDU that may be received by a third party device is one OFDM symbol next to L-PART and L-part. At this time, since L-STF and L-LTF are designed to reduce a PAPR, a part having the highest PAPR may generally be L-SIG. Therefore, a PAPR of one BPSK symbol which is added may be configured to have a value smaller than or the same as a PAPR of L-SIG. In this way, considering PAPR of different fields, one BPSK symbol may be configured.

Meanwhile, 1 BPSK symbol may be referred to as a BPSK-Mark field.

Method for Configuring Symbol by Repeating L-SIG

Considering that L-SIC has a bottleneck for PAPR, 1 BPSK symbol may be configured by repeatedly transmitting L-SIG. For example, a bit sequence for generation of 1 BPSK symbol may be the same as a bit sequence for generation of L-SIG.

Since BPSK modulation is applied to L-SIG field, it is advantageous that additional processing or operation of an AP for generating 1 BPSK symbol is not required. Also, since L-SIG is repeatedly transmitted, throughput for L-SIG may be improved.

L-length field of L-SIG within WUR PPDU is configured in a unit of 4 us, whereby a result of mod 3 operation always becomes 0. Therefore, if L-SIG is repeated, the third party device may prevent false detection indicating that WUR PPDU is 1 lax PPDU. In P may repeatedly transmit L-SIG and set a value of a length field of L-SIG to length mod 3=0, thereby indicating WUR PPDU to the third party device. For example, if a result of mod 3 of the repeated L-SIG length field is 0, the third party device may determine that a corresponding packet is WUR PPDU.

Meanwhile, even in case of 11ax PPDU (i.e., HE PPDU), the L-SIG field is repeated once more, and the repeated L-SIG field is referred to as RL-SIG. However, in 11ax PPDU, MOD 3 computation result for L-SIG is set so as not to be 0 (i.e., 1 or 2).

Therefore, when a 3rd Party STA has detected PPDU that includes L-SIG and L-SIG repetition and has performed MOD 3 computation for each of L-SIG and L-SIG repetition, if the result is (0,0), the 3rd Party STA may determine that the detected PPDU is WUR PPDU. Unlike this case, if the MOD 3 result is (1,1) or (2,2), the 3rd Party STA may determine that the detected PPDU is HE PPDU.

Meanwhile, a total of 48 subcarriers remain by excluding one center subcarrier and 4 pilot subcarriers of 53 subcarriers for the L-SIG field. A sequence mapped into 48 subcarriers is a sequence of a length of 48 devised by applying ½ coding to 24-bit sequence.

If 1 BPSK symbol for packet classification in WUR PPDU corresponds to repetition of the L-SIG field, the 24-bit sequence for the L-SIG field may equally be used even for 1 BPSK symbol.

Method for Configuring Symbol Through L-LTF Symbol

Figure 18:
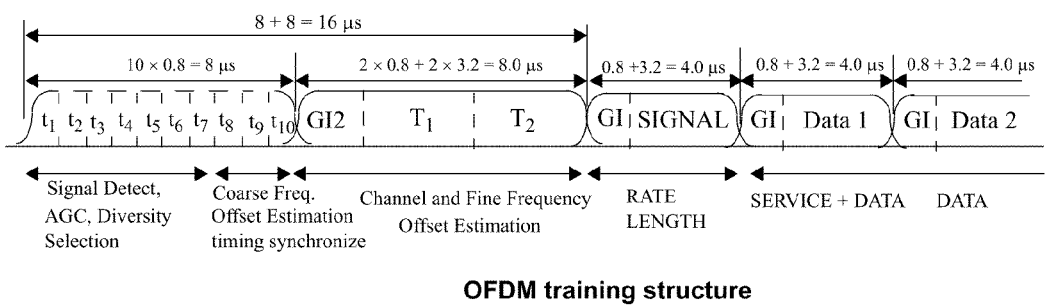
FIG. 18 illustrates an OFDM training symbol structure.

FIG. 18 illustrates an OFDM training symbol structure. Referring to FIG. 18, LTF symbol included in L-part includes two LTF symbols (T1, T2) of long CP (G12) of 1.6 us length+total 6.4 us length.

For example, 1 BPSK symbol includes Normal CP (0.8 us)+one LTF symbol (3.2 us), and may be generated by applying coefficient such as Equation 1 to available tones within 20 MHz.

$$L_{-26,26}=\{1,1,-1,-1,1,1,-1,1,-1,1,1,1,1,1,1,-1,-1,1,\\1,-1,1,-1,1,1,1,1,0,1,-1,-1,1,1,-1,1,-1,1,-1,\\1,-1,-1,-1,1,1,1,-1,-1,1,-1,1,-1,1,1,1,1,1\} \quad \text{[Equation 1]}$$

For another example, since a total length 8 us of L-LTF corresponds to a 2-symbol length, a half of L-LTF may be configured by 4 us symbol (e.g., 1 BPSK symbol).

Figure 19:
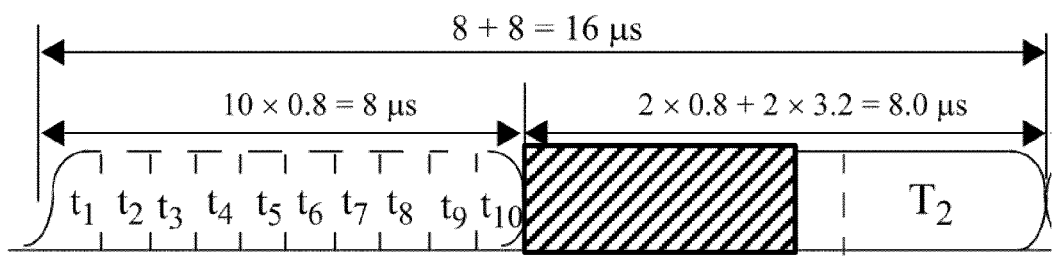
FIG. 19 illustrates that a first 4 us of L-LTF is configured by 1 BPSK symbol in accordance with one embodiment of the present disclosure.

FIG. 19 illustrates that a first 4 us of L-LTF is configured by 1 BPSK symbol. In this case, 1 BPSK symbol includes long CP (1.6 us)+a part (2.4 us) of first LTF symbol.

Figure 20:
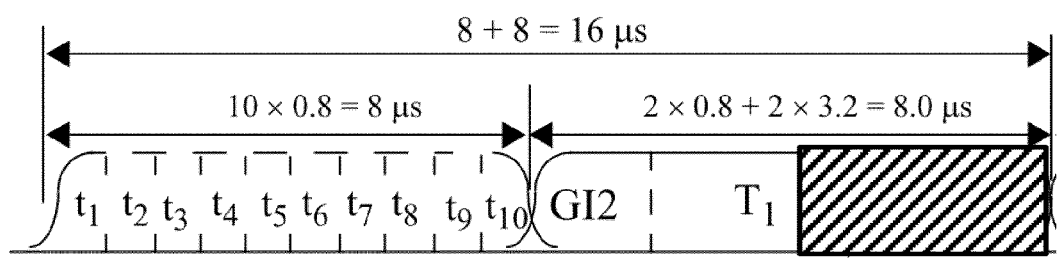
FIG. 20 illustrates that a second 4 us of L-LTF is configured by 1 BPSK symbol in accordance with another embodiment of the present disclosure.

FIG. 20 illustrates that a second 4 us of L-LTF is configured by 1 BPSK symbol. In this case, 1 BPSK symbol includes a part (0.8 us) of a first LTF symbol+a second LTF symbol (3.2 us).

For another example, 1 BPSK symbol may be configured using Extra tones.

An AP may further lower PAPR by configuring 1 symbol by additionally using extended tones (e.g., 4 tones) more than numerology of 11a. At this time, HT-LTF coefficient such as Equation 2 may be applied to the extended available tones.

$$HT\text{-}LTF_{-28,28}=\{1,1,1,1,-1,-1,1,1,-1,1,1,1,1,1,1,-\\1,-1,1,1,-1,1,-1,1,1,1,1,0,1,-1,-1,1,1,-1,1,-1,\\1,-1,1,-1,-1,-1,-1,1,1,-1,-1,1,-1,1,-1,1,1,1,1,\\1,-1,-1\}[\text{Equation2}]$$

The HT-LTF coefficient of Equation 2 may be replaced with VHT-LTF-28,28.

Alternatively, the coefficient may include L-LTF-26, 26 coefficient of Equation 1 and coefficient [−1 −1 −1 1] for 4 extra tones[−28, −27, 27, 28].

Meanwhile, the extra tones may be applied to L-SIG to lower PAPR. At this time, coefficient of the extra tones for reducing the PAPR of the L-SIG may be varied depending on a length of the WUR PPDU. At this time, a length field may be determined by frame body and FCS of the WUR PPDU.

The WUR PPDU may be configured using frame body (e.g., 0 byte, 16-byte) of various sizes and 16 FCS. At this time, a PAPR of L-SIG for the frame body and FCS 16-bit is as illustrated in FIG. 21.

In FIG. 21, FB0 and FB16 indicate a 0 byte frame body length and a 16-byte frame body length, respectively, L and H indicate a low data rate of 62.5 kbps and a high data rate of 250 kbps, respectively, and FCS 2 means FCS of a 2-byte length.

A sequence set having the worst PAPR indicated when considering various frame body sizes, 2-byte FCS and data rates of the WUR PPDU as illustrated in FIG. 21 may be used as a coefficient for extra tones. As a result, a sequence set 10 (e.g., 1−1 −1 1) may be applied to extra 4 tones.

Coefficients (e.g., 48 coefficients devised through 24-bit sequence) applied to L-SIG may equally be applied to 1 BPSK symbol transmitted to the WUR PPDU.

Method for Configuring Symbol by Signature Sequence

For example, 1 OFDM symbol for indicating WUR PPDU may be configured by a signature sequence. At this time, the signature sequence may be configured by BPSK sequence having 26/52/53 length.

The signature sequence may include pseudo noise (PN) sequence/orthogonal (e.g., Hadamard)/maximum length (ML) sequence having excellent auto-correlation characteristics. At this time, a sequence of an even length may be configured by adding 0 or 1 to a sequence of an odd length, wherein the number of 0 and 1 may equally be configured in the sequence of an even length.

The signature sequence may be subjected to mapping in time/frequency domain and transmitted through one symbol.

For example, if the signature sequence is transmitted from the time domain, the signature sequence may be transmitted as listed in the followings (i)-(iii) in accordance with a length.

(i) One OFDM Symbol Configuration Based on Length 26 (i.e., signature_seq26)

[0 0 0 0 0 0 signature_seq26 0 signature_seq26 0 0 0 0 0]

In order to prevent a PAPR from being increased by repeated transmission of the same signal within one symbol, the symbol may be configured as follows.

[0 0 0 0 0 0 signature_seq26 0−1*(signature_seq26) 0 0 0 0 0]

[0 0 0 0 0 0 −1*(signature_seq26) 0 signature_seq26 0 0 0 0 0]

[0 0 0 0 0 0 signature_seq26 0 (signature_seq26)*0 0 0 0 0]

S* means a complementary sequence of a sequence S.

(ii) One OFDM Symbol Configuration Based on Length 52 (i.e., signature_seq52)

[0 0 0 0 0 0 left_26 coefficient of signature_seq52 0 right 26 coefficient of _signature_seq52 00 0 0 0]

(iii) One OFDM Symbol Configuration Based on Length 53 (i.e., signature_seq53)

[0 0 0 0 0 0 signature_seq53 0 0 0 0 0]

Meanwhile, the aforementioned signature sequences transmitted by being carried in one symbol may be used to indicate WUR and indicate information to a third party device (e.g., future device). In order to indicate various kinds of information, the signature sequences may be configured based on a sequence set having multiple sequences. When the AP intends to indicate specific information, the AP may select a signature sequence corresponding to the specific information from the sequence set and transmit the selected signature sequence through one symbol.

For example, a sequence set having two sequences may be used to indicate whether a transmission packet is a WUR packet or a packet for a future STA. If two signature sequences are used, the signature sequence may include S and S*. S* means a Complementary Sequence for the signature sequence S.

For another example, the AP may transmit one OFDM symbol by carrying information on packet indication and information on packet transmission in one OFDM symbol.

One OFDM symbol may be encoded by applying MCS0 (i.e., BCC ½ rate and BPSK modulation).

One OFDM symbol may include 4-bit CRC, 6-bit tail bit and 14-bit information field.

The 14-bit information field may include the following information, for example.

Packet indication (e.g., ½ bit): may be information used to indicate which packet is transmitted. For example, ifWUR packet and future packet are only indicated, packet indication information may be 1-bit, or may include 2-bit for future extension.

BSS color information: may indicate whether a transmitted packet is its BSS or OBSS. Power consumption of the future device may be reduced through early indication for BSS. The BSS Color information may include 6 to 11 bits.

TXOP: TXOP information may be transmitted for protection of a packet which is currently transmitted. Therefore, channel access and interference may be less affected by third party devices.

Figure 22:
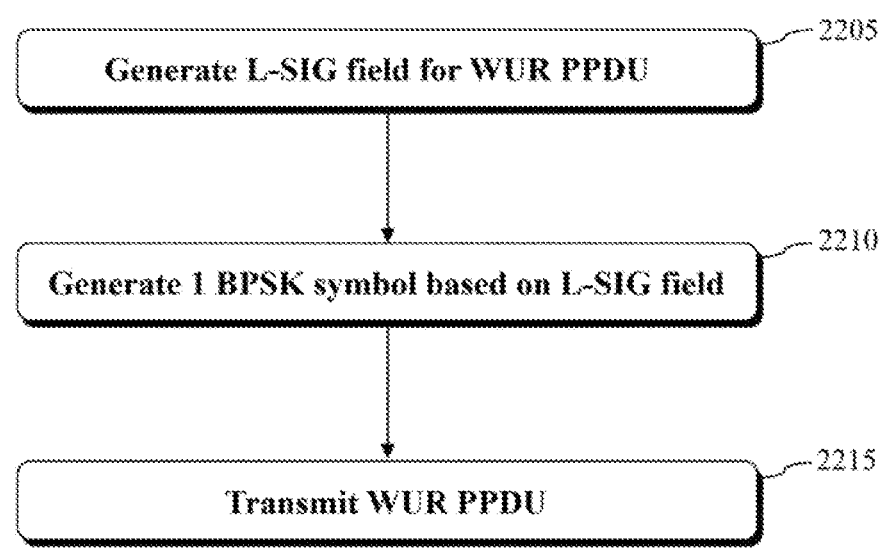
FIG. 22 illustrates a flow of a method for transmitting WUR PPDU according to one embodiment of the present disclosure.

FIG. 22 illustrates a flow of a method for transmitting WUR PPDU according to one embodiment of the present disclosure.

Referring to FIG. 22, the AP generates L-SIG (legacy-signal) field for WUR (wake-up radio) PPDU (2205).

The AP generates 1 BPSK (binary phase shift keying) symbol located between L-SIG field and WUR band preamble based on the L-SIG field (2210). The AP may generate 1 BPSK symbol based on the same bit sequence as a bit sequence for the L-SIG field. For example, the AP may generate 1 BPSK symbol by repeating the L-SIG in the time domain.

The L-SIG field may include length information on WUR PPDU. The AP may configure length information such that modulo 3 computation for length information included in each of the L-SIG field and the 1 BPSK symbol where L-SIG field is repeated satisfies 0.

The AP transmits WUR PPDU that includes L-SIG field, 1 BPSK symbol and WUR band preamble (2215).

The L-SIG field for WUR PPDU may be transmitted using more additional tones in the frequency domain than the L-SIG field for PCR (primary connectivity radio) PPDU.

The L-SIG field for PCR PPDU may correspond to a total of 53 tones including a center tone, and the L-SIG field for WUR PPDU may correspond to a total of 57 tones including a center tone.

A sequence to be applied to additional tones may be a sequence having a minimum PAPR (peak-to-average power ratio) for a frame body size, FCS (frame check sequence) and combinations of data rates, which are supported from the WUR PPDU.

The number of additional tones may be 4, and a sequence to be applied to additional tones may be [1, −1, −1, 1].

The frame body size supported from the WUR PPDU may include 0 byte and 16 bytes, the FCS may include 2 bytes, and the data rate may include 62.5 kbps and 250 kbps.

Figure 23:
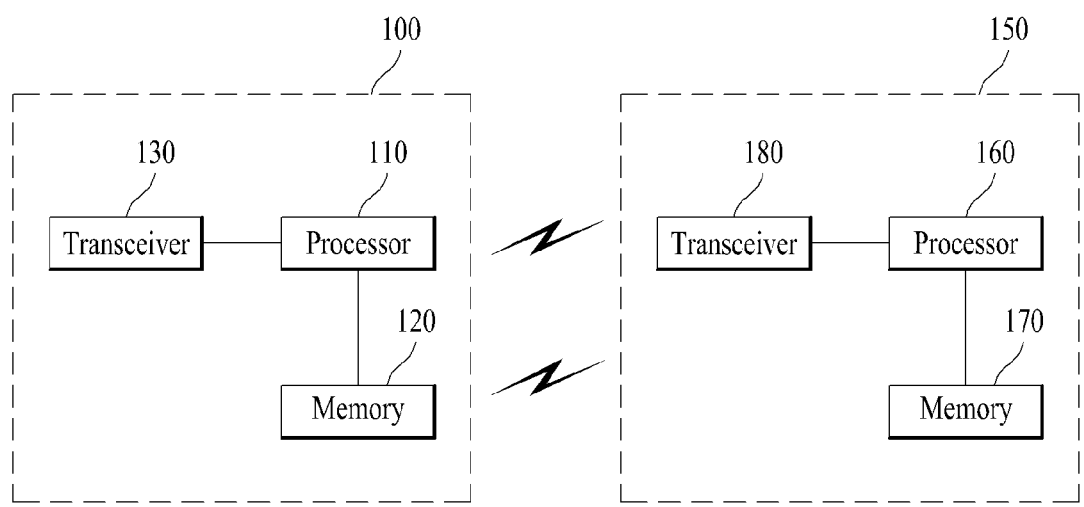
FIG. 23 is an explanatory diagram of an apparatus according to one embodiment of the present disclosure.

FIG. 23 is an explanatory diagram of an apparatus for implementing the above-described method.

A wireless apparatus 100 of FIG. 23 may correspond to the above-described specific STA and a wireless apparatus 850 of FIG. 23 may correspond to the above-described AP.

The STA 100 may include a processor 110, a memory 120, and a transceiver 130 and the AP 150 may include a processor 160, a memory 170, and a transceiver 180. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The transceiver 130 of the STA may include a transmitter (not shown) and a receiver (not shown). The receiver of the STA may include a primary connectivity receiver for receiving a PCR (e.g., WLAN such as IEEE 802.11a/b/g/n/ac/ax) signal and a WUR receiver for receiving a WUR signal. The transmitter of the STA may include a PCR transmitter for transmitting a PCR signal.

The transceiver 180 of the AP may include a transmitter (not shown) and a receiver (not shown). The transmitter of the AP may correspond to an OFDM transmitter. The AP may transmit a WUR payload by an OOK scheme by reusing an OFDM transmitter. For example, the AP may modulate the WUR payload by an OOK scheme through an OFDM transmitter as described above.

The detailed description of the exemplary embodiments of the present disclosure has been given to enable those skilled in the art to implement and practice the invention. Although the invention has been described with reference to the preferred embodiments, those skilled in the art will appreciate that various modifications and variations can be made in the present disclosure without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present disclosure may be applied to various wireless communication systems including an IEEE 802.11 system.

The invention claimed is:

1. A method for transmitting a physical protocol data unit (PPDU) by an access point (AP) in a wireless LAN (WLAN), the method comprising:
generating a legacy-signal (L-SIG) field for a wake-up radio (WUR) PPDU;
generating one (1) binary phase shift keying (BPSK) symbol located between the L-SIG field and a WUR band preamble on the basis of the L-SIG field; and
transmitting the WUR PPDU including the L-SIG field, the 1 BPSK symbol, and the WUR band preamble,
wherein the AP generates the 1 BPSK symbol on the basis of the same bit sequence as a bit sequence for the L-SIG field,
wherein the L-SIG field for the WUR PPDU is transmitted using more additional tones in a frequency domain than an L-SIG field for a primary connectivity radio (PCR) PPDU, and
wherein the number of additional tones is 4, and a sequence to be applied to the additional tones is [1, −1, −1, 1].

2. The method of claim 1, wherein the 1 BPSK symbol repeats the L-SIG field in a time domain.

3. The method of claim 2, wherein the L-SIG field includes length information on the WUR PPDU, and the AP configures the length information such that modulo 3 computation for length information included in each of the L-SIG field and the 1 BPSK symbol where L-SIG field is repeated satisfies 0.

4. The method of claim 1, wherein the L-SIG field for the PCR PPDU corresponds to a total of 53 tones including a center tone, and the L-SIG field for the WUR PPDU corresponds to a total of 57 tones including a center tone.

5. The method of claim 1, wherein a sequence to be applied to the additional tones is a sequence having a minimum peak-to-average power ratio (PAPR) for a frame body size, frame check sequence (FCS) and combinations of data rates, which are supported from the WUR PPDU.

6. The method of claim 1, wherein the frame body size supported from the WUR PPDU includes 0 byte and 16 bytes, the FCS includes 2 bytes, and the data rate includes 62.5 kbps and 250 kbps.

7. An access point (AP) for transmitting a physical protocol data unit (PPDU) in a wireless LAN (WLAN), the AP comprising:
a processor generating a legacy-signal (L-SIG) field for a wake-up radio (WUR) PPDU and generating one (1) binary phase shift keying (BPSK) symbol located between the L-SIG field and a WUR band preamble on the basis of the L-SIG field; and
a transmitter transmitting the WUR PPDU including the L-SIG field, the 1 BPSK symbol, and the WUR band preamble under the control of the processor,
wherein the processor generates the 1 BPSK symbol on the basis of the same bit sequence as a bit sequence for the L-SIG field,
wherein the L-SIG field for the WUR PPDU is transmitted using more additional tones in a frequency domain than an L-SIG field for a primary connectivity radio (PCR) PPDU, and
wherein the number of additional tones is 4, and a sequence to be applied to the additional tones is [1, −1, −1, 1].

8. The AP of claim 7, wherein the 1 BPSK symbol repeats the L-SIG field in a time domain.

9. The AP of claim 7, wherein the L-SIG field includes length information on the WUR PPDU, and the processor configures the length information such that modulo 3 computation for length information included in each of the L-SIG field and the 1 BPSK symbol where L-SIG field is repeated satisfies 0.

10. The AP of claim 7, wherein the L-SIG field for the PCR PPDU corresponds to a total of 53 tones including a center tone, and the L-SIG field for the WUR PPDU corresponds to a total of 57 tones including a center tone.

11. The AP of claim 7, wherein a sequence to be applied to the additional tones is a sequence having a minimum peak-to-average power ratio (PAPR) for a frame body size, frame check sequence (FCS) and combinations of data rates, which are supported from the WUR PPDU.

12. The AP of claim 11, wherein the frame body size supported from the WUR PPDU includes 0 byte and 16 bytes, the FCS includes 2 bytes, and the data rate includes 62.5 kbps and 250 kbps.

\* \* \* \* \*